F. C. HINCKLEY.
TALKING MACHINE.
APPLICATION FILED MAR. 20, 1917.
1,422,266.
Patented July 11, 1922.
9 SHEETS—SHEET 3.
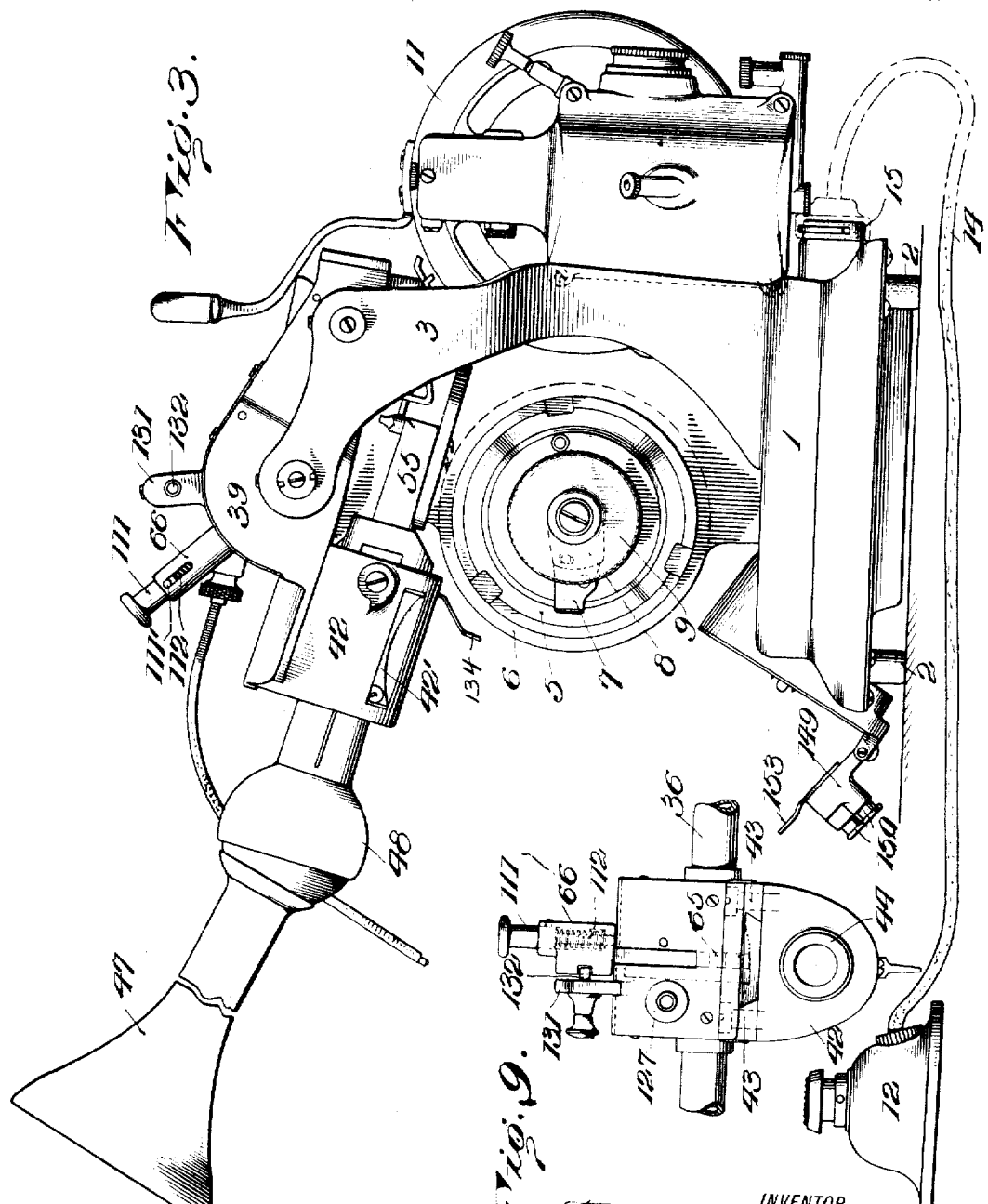
INVENTOR
Frank C Hinckley
BY
Munn Cameron Lewis & Massie
ATTORNEYS

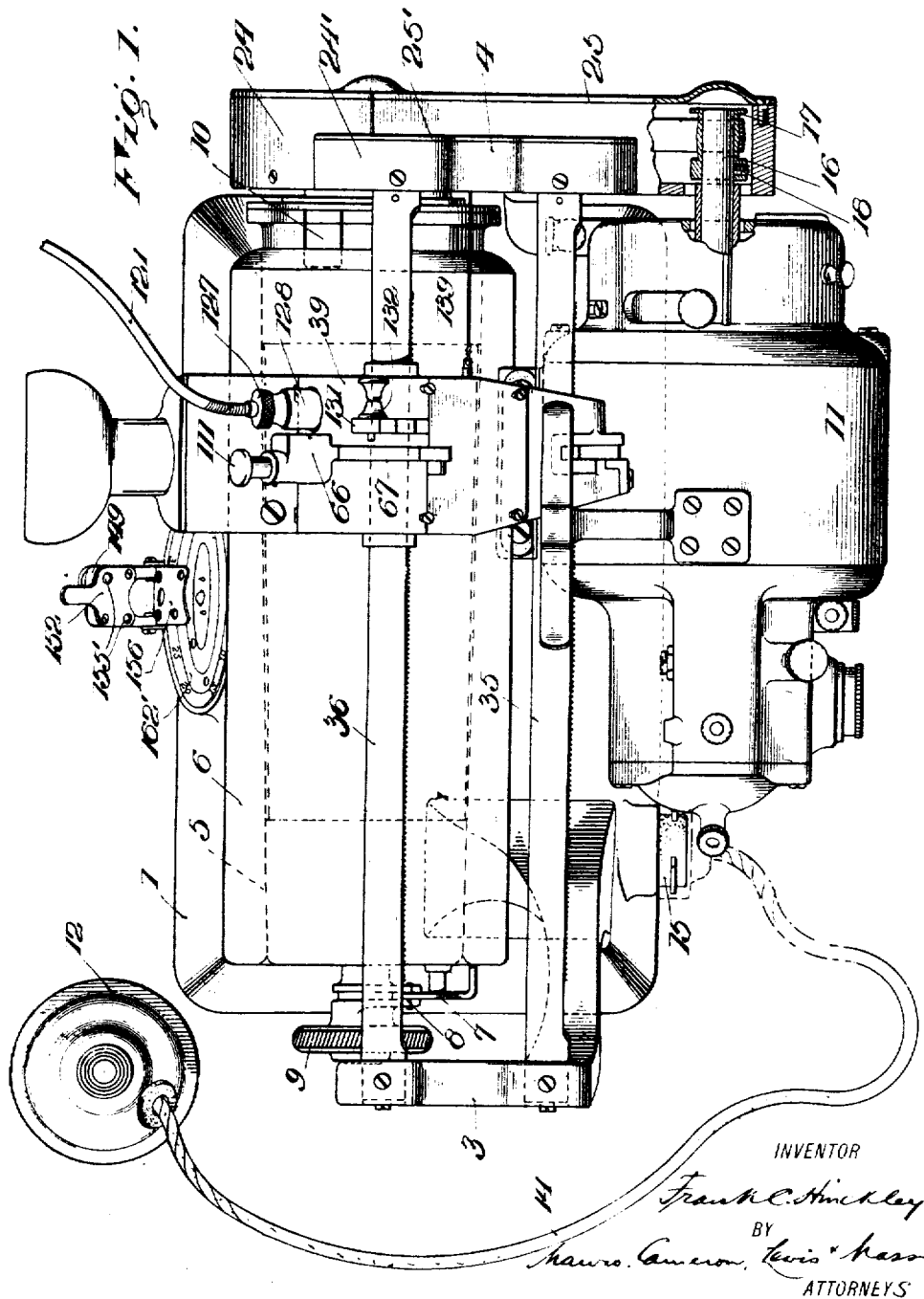

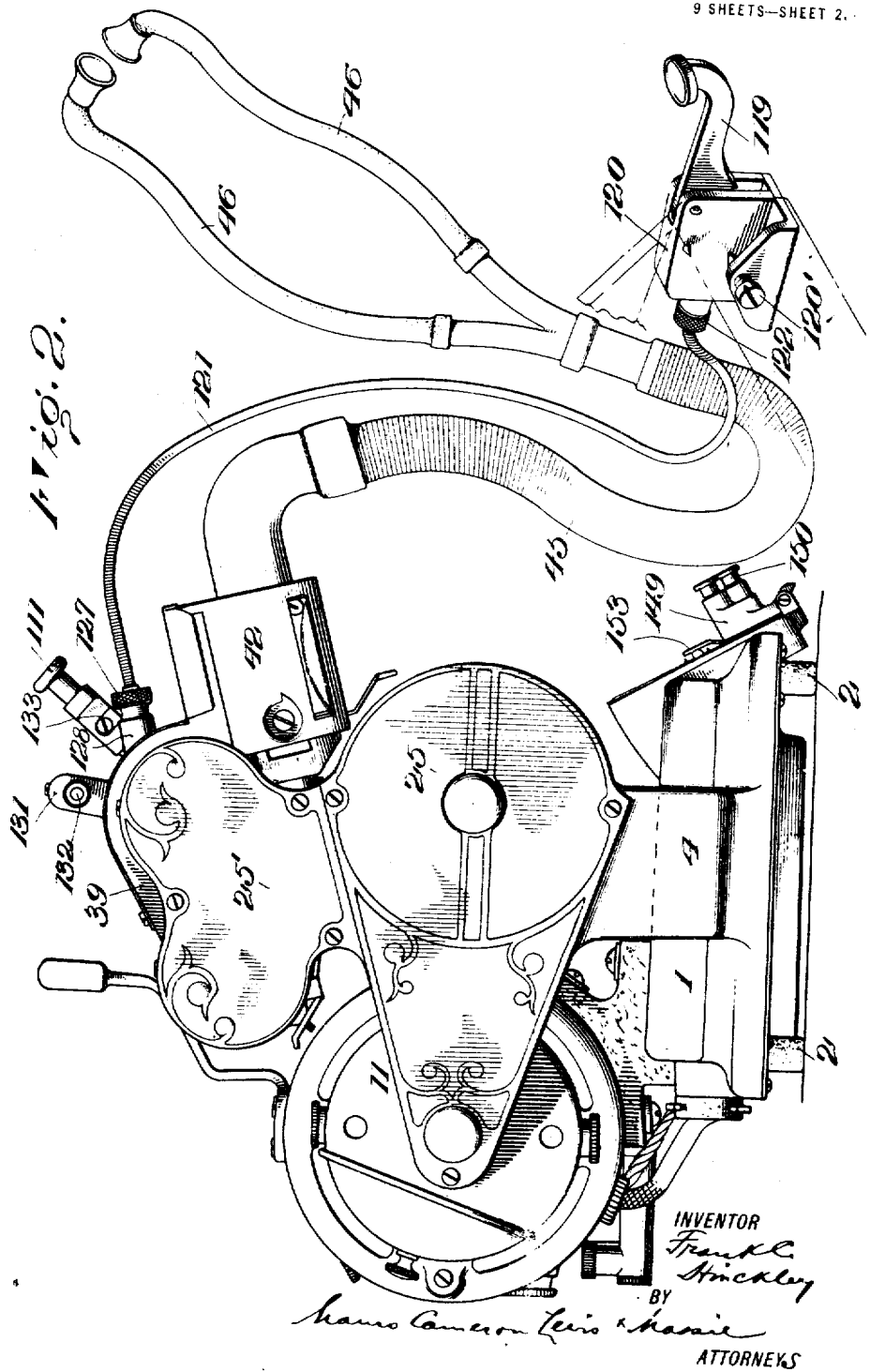

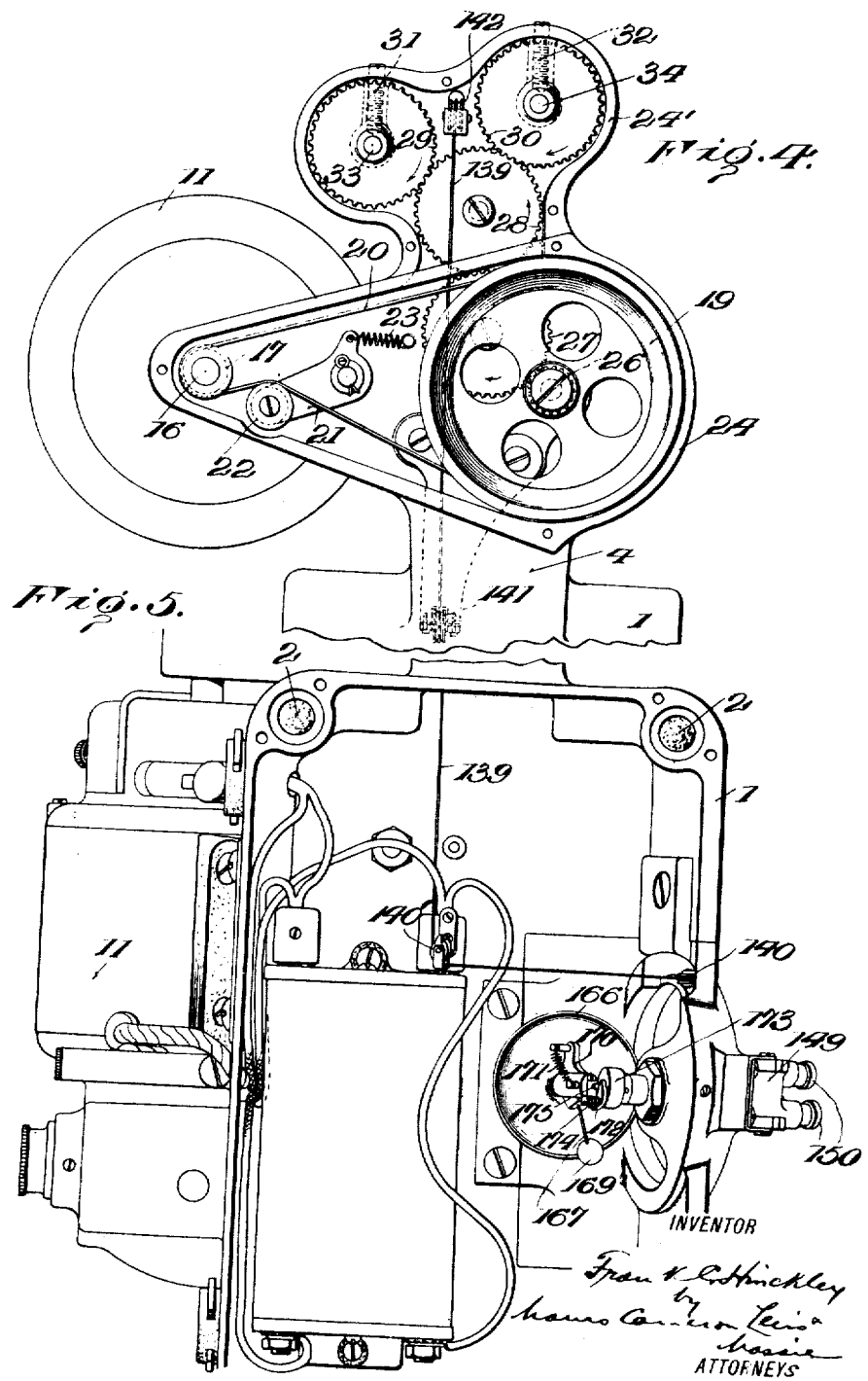

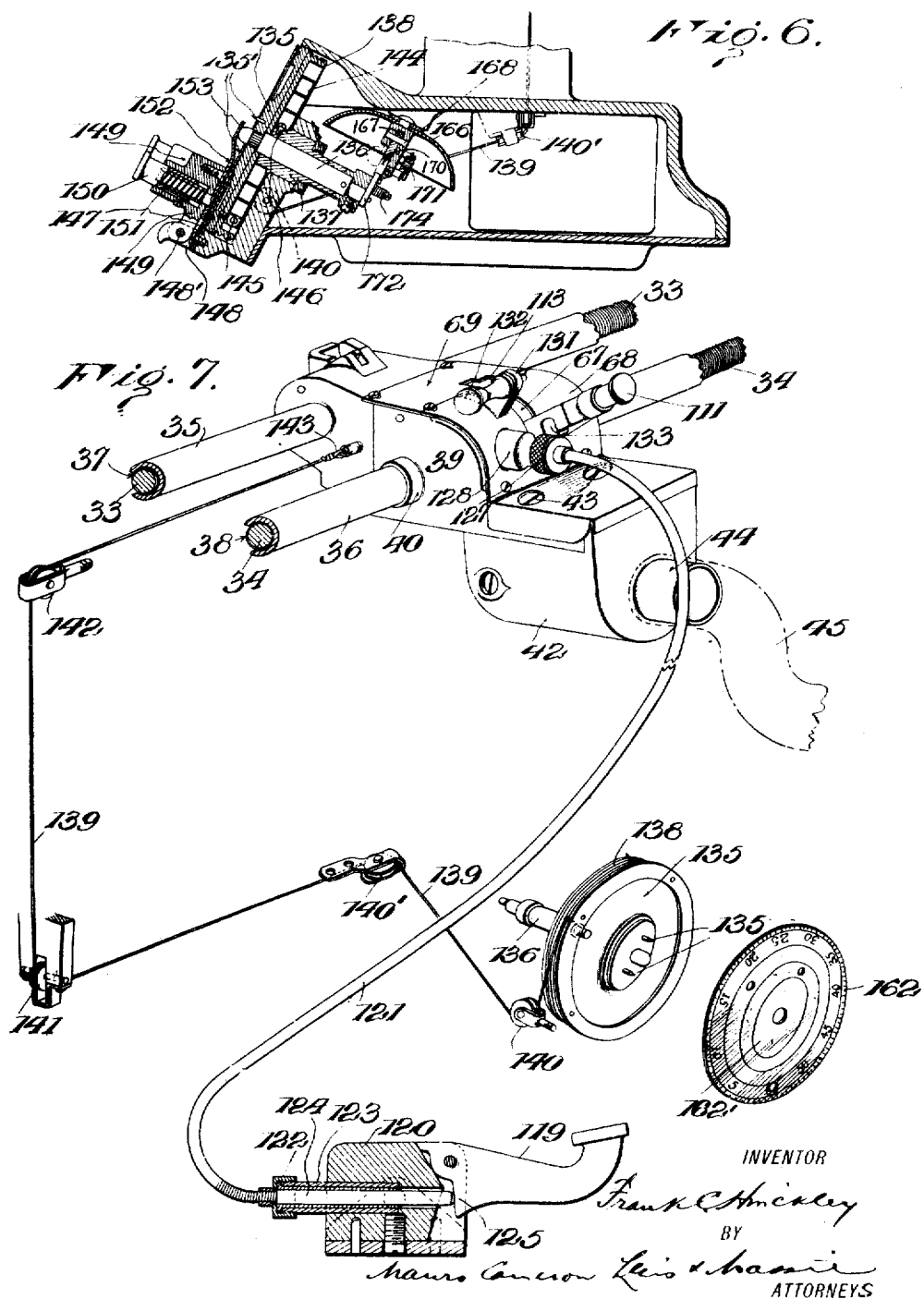

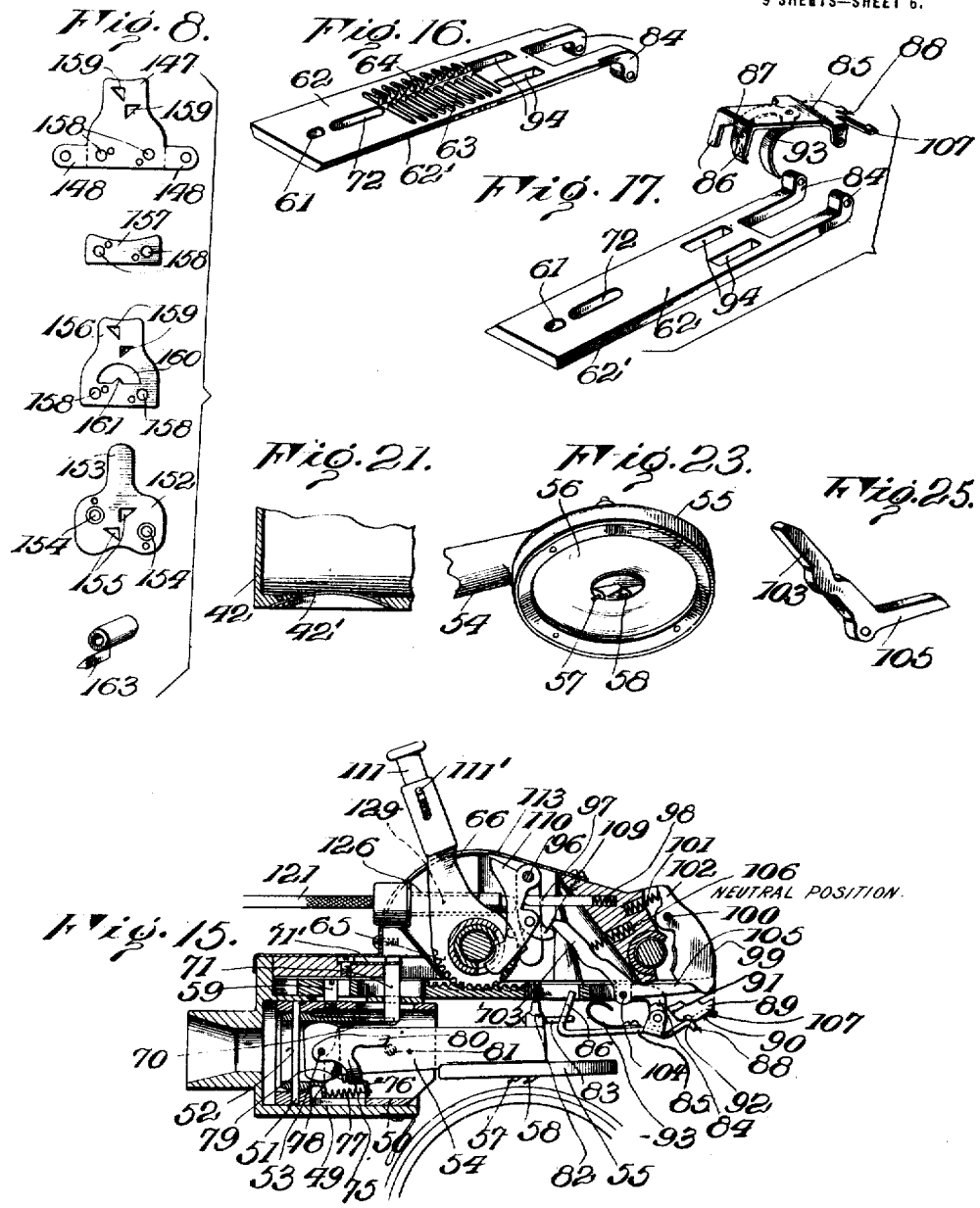

F. C. HINCKLEY.
TALKING MACHINE.
APPLICATION FILED MAR. 20, 1917.
1,422,266.
Patented July 11, 1922.
9 SHEETS—SHEET 7.
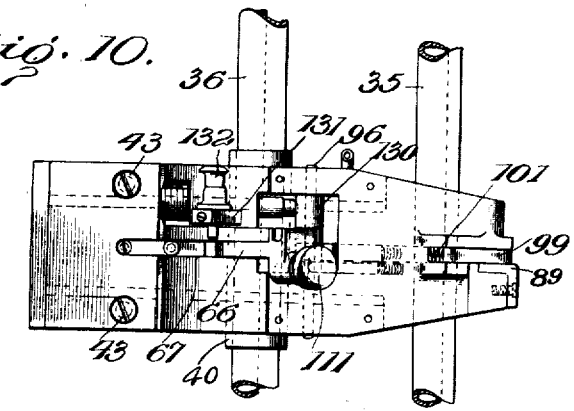
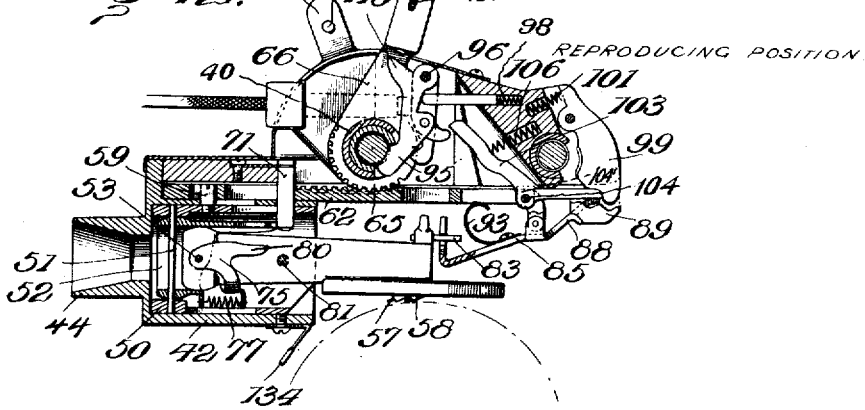
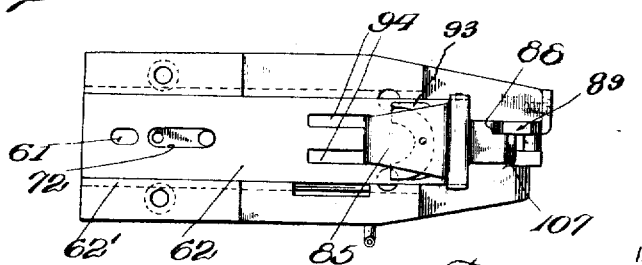
INVENTOR
Frank C. Hinckley
BY
ATTORNEYS

F. C. HINCKLEY.
TALKING MACHINE.
APPLICATION FILED MAR. 20, 1917.

1,422,266.

Patented July 11, 1922.
9 SHEETS—SHEET 8.

Inventor
Frank C. Hinckley
By Munn, Cameron, Lewis & Massie
Attorneys

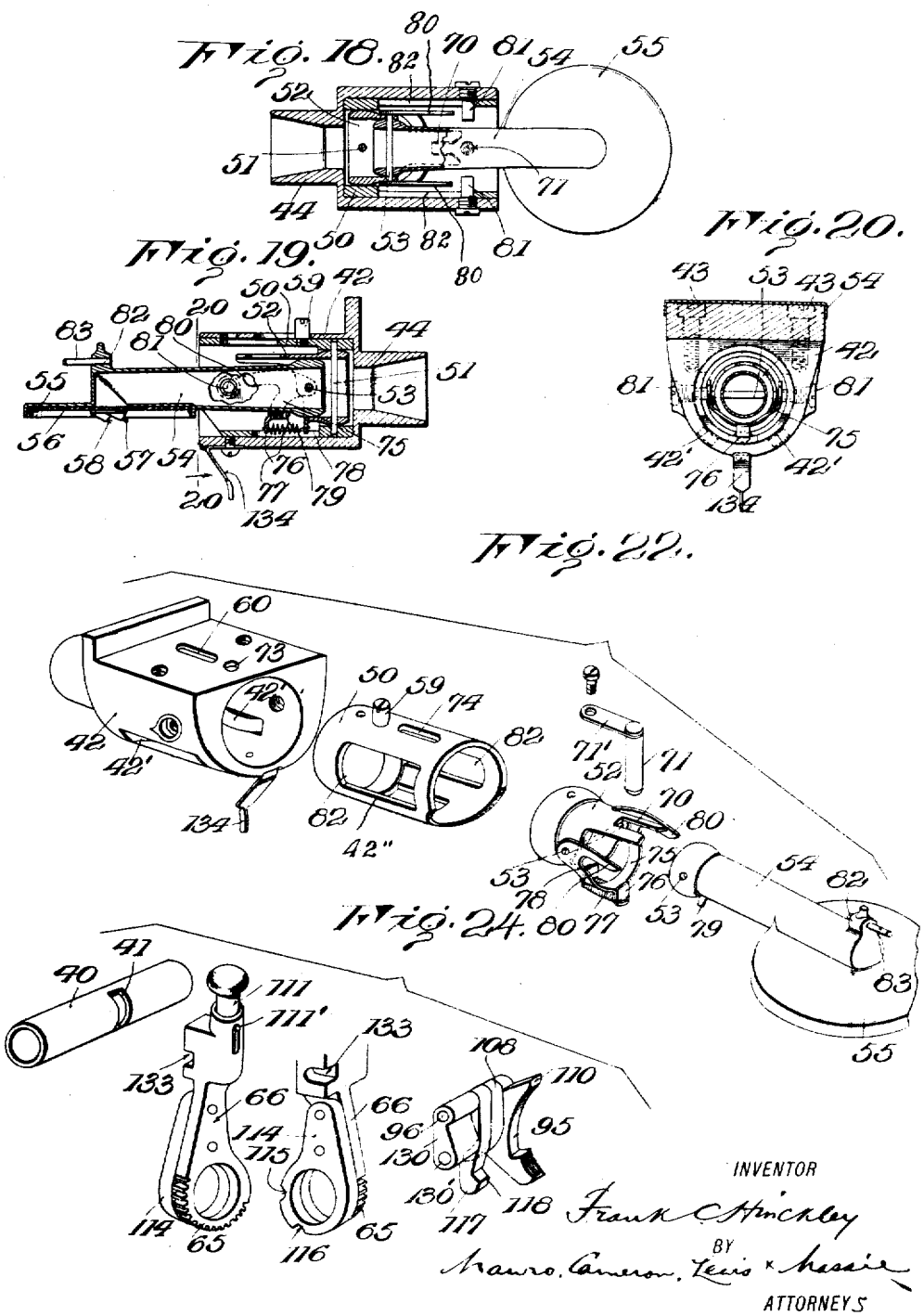

UNITED STATES PATENT OFFICE.

FRANK C. HINCKLEY, OF BRIDGEPORT, CONNECTICUT, ASSIGNOR, BY MESNE ASSIGNMENTS, TO COLUMBIA GRAPHOPHONE MANUFACTURING COMPANY, OF BRIDGEPORT, CONNECTICUT, A CORPORATION OF DELAWARE.

TALKING MACHINE.

1,422,266.  Specification of Letters Patent.  Patented July 11, 1922.

Application filed March 20, 1917. Serial No. 156,044.

*To all whom it may concern:*

Be it known that I, FRANK C. HINCKLEY, a citizen of the United States of America, and a resident of Bridgeport, Connecticut, have invented a new and useful Improvement in Talking Machines, which invention is fully set forth in the following specification.

This invention relates to sound-recording and reproducing machines and, while capable of use in a wide variety of machines of this type, has special utility as respects certain features thereof when employed in machines for recording and reproducing dictation.

An object of this invention is to provide a sound-recording or reproducing machine having a novel arrangement of parts, whereby simplicity, lightness and compactness are obtained.

Yet another object of this invention is to provide improved feeding mechanism for the sound-box together with improved mechanism for controlling the same, enabling greater facility of control and ease of manipulation.

Another object of this invention is to provide an improved back-spacing device together with controlling means therefor whereby the same may be manipulated from a distance.

Yet another object of this invention is to provide back-spacing mechanism together with a controlling means therefor which is operable only when the sound-box is in reproducing position.

Still another object of this invention is to provide an improved mounting for a combined recorder and reproducer, whereby the sound-box is permitted movement in planes at right-angles to each other and is resiliently pressed upon the record when the sound-box is in reproducing position, and whereby the sound-box is prevented from lateral movement and the means for pressing the same into engagement with the record is rendered functionally inoperative when the sound-box is in recording position.

Yet another object of this invention is to provide improved mechanism for moving the sound-box into and out of recording and reproducing position.

Another object of this invention is to provide improved means for controlling the raising and lowering of the sound-box whereby it is raised from engagement with the record as the sound-box is moved into and out of recording and reproducing position and when the back-spacing mechanism is thrown into operation.

Other objects relate to the provision of a sound-recording or reproducing machine which is simple in construction, efficient in operation and easily manipulated and controlled. Other objects will appear as the description of the invention proceeds.

Stated broadly, the invention comprises a sound-recording or reproducing machine wherein is provided a sound-box in combination with means for advancing and returning the sound-box across the record, preferably in the form of forward and return feed screws and co-acting feed nuts; means for moving the sound-box into and out of recording and reproducing position preferably in the form of a rack and sector gear; means permitting movement of the sound-box in planes at right-angles to each other when the same is in reproducing position; means for resiliently pressing the sound-box into engagement with the record when the same is in reproducing position; means for preventing lateral movement of the sound-box when the same is in recording position; means for rendering functionally inoperative said device for resiliently pressing the sound-box into engagement with the record when the latter is in recording position; means for raising and lowering the sound-box as the latter is moved from recording to reproducing position, or vice versa, and when the sound-box returning mechanism is thrown into operation; and means for controlling the operation of said feeding means and said sound-box raising- and-lowering means, said last-named means preferably comprising two separate devices one of which is local to the machine and operable to actuate the sound-box returning or back-spacing mechanism only when the sound-box is in reproducing position, and the other of which comprises a device movable bodily at will with respect to the machine and desirably made attachable to a typewriter frame.

Associated with the aforesaid mechanism is an attachment, namely a correction device, comprising a support for a correction-sheet which is preferably rotatable, one or more markers for co-action with a correction-sheet on said support and preferably mounted for movement into and out of operative relation with the correction-sheet, and means for causing relative movement of said support and markers simultaneously with and in proportion to the movement of the sound-box across the record. When a plurality of makers are employed, they are preferably so positioned as to co-act respectively with different paths on the correction-sheet. This attachment is claimed in a divisional application Serial Number 227,941, filed April 11, 1918.

The invention is capable of receiving a variety of mechanical forms, one of which is shown on the accompanying drawings, but it is to be expressly understood that such drawings are for purposes of illustration only and are not to be construed as definitions of the limits of the invention, reference being had to the appended claims for that purpose.

In said drawings—

Fig. 1 is a plan view of a sound-recording or reproducing machine embodying the present invention;

Fig. 2 is an end elevation taken from the right-hand end of Fig. 1;

Fig. 3 is an end elevation taken from the left-hand end of Fig. 1;

Fig. 4 is a fragmentary end elevation corresponding with Fig. 2, but with the cover plates removed to expose the driving mechanism;

Fig. 5 is a bottom plan view;

Fig. 6 is a cross section through the base of the machine showing the correction device in section;

Fig. 7 is a perspective view showing the sound-box, its feeding mechanism, a control-device therefor, and parts of the correction device separated from the rest of the machine;

Fig. 8 is a detail of certain elements of the correction device;

Fig. 9 is an end elevation of the sound-box carriage;

Fig. 10 is a top plan view of said carriage;

Fig. 11 is a bottom plan view of the main portion of said carriage;

Fig. 12 is a longitudinal sectional view of the carriage with the parts in reproducing position;

Fig. 15 is a similar view with the parts in neutral position;

Fig. 16 is a detail perspective of the slide;

Fig. 17 is a detail perspective of the slide inverted and showing in detached relationship the sound-box elevating lever;

Fig. 18 is a horizontal longitudinal sectional view through the sound-box supporting means;

Fig. 19 is a vertical longitudinal sectional view through the sound-box supporting means;

Fig. 20 is a transverse sectional view taken on the line 20—20 of Fig. 19;

Fig. 21 is a fragmentary sectional view of the reciprocating sleeve;

Fig. 22 is a perspective view showing in detail the sound-box and its supporting elements in separated relationship;

Fig. 23 is a perspective of the sound-box;

Fig. 24 is a perspective of details of the sound-box moving and controlling mechanism, showing the parts in separated relationship; and Fig. 25 is a detail of the lever for operating the back-spacing mechanism and the sound-box raising-and-lowering means.

Figure 13:
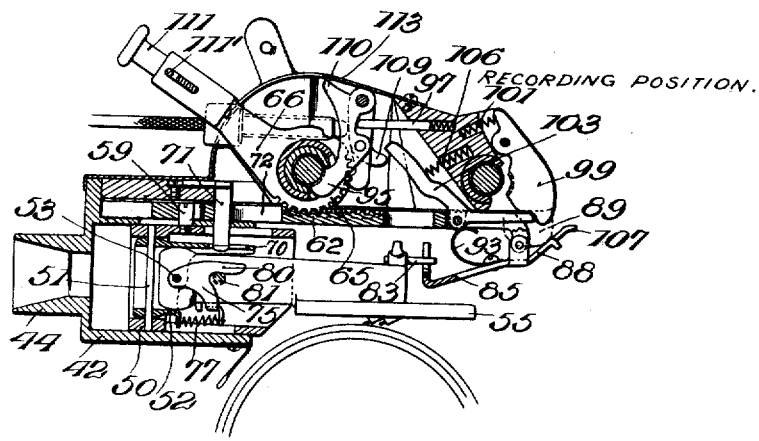
Fig. 13 is a similar view with the parts in recording position.

Referring in detail to said drawings, wherein the same reference characters designate corresponding parts in the several figures, 1 represents the base or main frame of the machine, said frame preferably being in the form of a casting and desirably made of aluminum for the sake of lightness. As shown, said frame is rectangular in form and provided with a plurality of supporting posts 2, desirably made of rubber or similar material so that the machine shall not mar the surface upon which it is supported. Extending upwardly from the main frame 1 at the ends thereof, and preferably formed integrally therewith, are two standards 3 and 4. Standard 4 supports for rotation any suitable form of mandrel 5. Said mandrel may be provided desirably with means for locking the record tablet 6 upon said mandrel and for ejecting the same therefrom as described and claimed in my Patent Number 1,291,516, granted January 14, 1919. As shown, a pivotally and axially movable dog or lever 7 is pivotally connected to the ears 8 of an operating knob 9 whereby the said dog or lever may be moved into a position to engage the record-tablet and lock the same upon the mandrel, or may be moved within the periphery of the end of the mandrel. A record-ejecting finger or lug is illustrated at 10.

Also mounted upon the base 1 is any suitable motor 11 such, for example, as that described and claimed in the patent of Clinton E. Woods, Number 1,293,602, granted February 4, 1919. Said motor, when electrical, may be provided with any suitable switch, that illustrated comprising a foot-operated switch 12 connected by wires within the cord 14 to a suitable plug at 15. Obviously a hand-controlled device mounted, for example, upon the conduit communicating with the sound-box, as illustrated in said patent of Clinton E. Woods, could be employed with equal facility.

Said motor is preferably mounted with its shaft 16 parallel to the mandrel-shaft and has mounted upon one end thereof the belt wheel 17, shown as fixed with respect to the motor shaft 16 by a set-screw 18. For rotating the mandrel 5, a belt wheel 19 is secured upon the projecting end of the mandrel-shaft and rotatably connected with belt wheel 17 by the belt 20. To insure a proper engagement of belt 20 with said belt wheels 17 and 19, any suitable form of belt tightener may be employed, that shown comprising a lever 21 carrying a friction pulley 22 normally urged into engagement with said belt by a spring 23 connected to one arm of said lever 21 and to the standard 4. Said belt wheels, belt and belt tightener are preferably enclosed within a housing 24 provided with a detachable cover plate 25. Also mounted upon the mandrel-shaft is a pinion 26 meshing with an idler pinion 27 rotatably supported upon said standard 4, said pinion 27 meshing with a second idler pinion 28 similarly mounted upon said standard 4. Pinion 28 meshes with two pinions 29 and 30 fast on feed screws 33 and 34, one for advancing the sound-box, and the other for returning said sound-box, across the record tablet 6. Said gearing is desirably enclosed in a housing 24' in communication with housing 24, and closed by a detachable cover plate 25'. Said feed screws are preferably right and left-hand screws respectively, and the return feed screw, which with its co-acting nut constitutes a back-spacing mechanism, is preferably made of greater pitch than the screw for advancing the sound-box so as to enable a quicker return thereof.

Feed screws 33 and 34 are shown as encased in hollow guides 35 and 36 respectively, said guides and feed screws being supported at their opposite ends in the standards 3 and 4, the guides being held therein by their set screws 31 and 32 (see Fig. 4). Said guides 35 and 36 are each cut away at one side, as shown at 37 and 38 respectively, to enable the feed screws to be engaged by the feed nuts to be described hereinafter. Supported upon said guides 35 and 36 is a sound-box carriage, generally indicated at 39. As shown more clearly in Fig. 7, said carriage directly engages the guide 35, but a short sleeve 40 is interposed between said carriage and guide 36, said sleeve 40 being also cut away at one side, as shown at 41 (see Fig. 24), to provide for engagement with the feed screw 34 of its co-acting feed nut.

Carriage 39 at its forward end is provided with a depending chambered extension 42, the same being desirably attached to the carriage proper by two screws 43. Said extension is provided on its forward face with a nipple 44 to which may be attached a flexible tube 45 carrying ear pieces 46 as shown in Fig. 2, or a mouth-piece 47 as shown in Fig. 3 may be provided. When a mouth-piece is employed, the same is preferably connected with said nipple through the intermediary of a ball-and-socket connection, as shown at 48, to enable the dictator to position the mouth-piece as desired.

Extension 42 has a cylindrical bore, as shown at 49, and mounted to reciprocate within said bore 49 is an outer cylindrical sleeve 50. The bore of the sleeve 50 is reduced in diameter adjacent the forward end thereof, and pivoted within said reduced portion upon vertical pin 51 is a second sleeve 52 provided with a spherical enlargement at its forward end to closely fit the bore of said reduced portion. Pivoted within said sleeve 52 upon pivot pin 53 extending at right-angles to said pivot pin 51 is the neck 54 of a sound-box 55, said neck being provided with a spherical enlargement at its forward end to closely fit the bore of sleeve 52. The sound-box 55 may be of any suitable construction, that illustrated comprising a combined recorder-reproducer of the type described and claimed in patent to Clinton E. Woods No. 1,218,918, granted Mar. 13, 1917, wherein the diaphragm 56 is provided at points spaced both longitudinally and transversely of the sound-box with a recording stylus 57 and a reproducing stylus 58. Owing to the spacing of said styli longitudinally of the sound-box, said styli may be moved into operative position respectively by the longitudinal movement of the sound-box. As respects the transverse spacing of said styli, the recording stylus is preferably placed slightly in advance of the reproducing stylus so that upon moving said sound-box from recording to reproducing position, the last line or two may be reproduced without shifting said sound-box backwardly; while, on the other hand, upon shifting the sound-box from reproducing to recording position at the end of the record zone, assurance is had that the recording stylus will be sufficiently spaced in advance of said zone not to destroy or injure the sound record groove.

To move the sound-box 55 into and out of recording and reproducing position, sleeve 50 is provided with an upwardly extending stud 59 which extends through a longitudinal groove 60 (see Fig. 22) provided in the upper plane face of the extension 42 and engages with provision for lost movement in a slot 61 (see Fig. 16) provided in a slide 62.

To frictionally retain the sleeve 50 in any position to which it may be moved, the extension 42 may be provided with one or more springs 42' (see Fig. 22) positioned within recesses in said extension and bowed into bore 49 to frictionally engage the outer surface 42 of said sleeve.

As shown, slide 62 is provided with beveled edges 62' which engage in suitable ways provided on the under side of the carriage 39. Slide 62 is provided on its upper surface with rack teeth 63 which are intersected by a longitudinal groove 64, as clearly shown in Fig. 16. For actuating said slide 62, a sector gear 65 is mounted loose on the fixed sleeve 40 and provided with an operating crank 66 extending to the outside of the carriage through a longitudinal slot 67.

As shown in Fig. 7, said carriage is provided with a curved detachable cover 68 in which is said slot 67, said cover preferably being concentric with feed screw 34, guide 36 and sleeve 40 for a reason that will appear hereinafter. Said cover may, if desired, be made in two separable sections, the second cover portion being illustrated at 69.

It is known that in recording sound, the sound-box should be held rigidly against lateral movement and should engage the tablet lightly so as to leave the diaphargm the requisite freedom to respond to the sound waves that are to be recorded. On the other hand, it is known that for reproducing the recorded sound the sound-box should be permitted relatively free lateral movement to enable the stylus to trace the record groove accurately and follow any deviations therein or to compensate for any lack of uniformity between the pitch of said groove and the pitch of the feed screw, and that the sound-box should be pressed firmly into engagement with the record tablet so as to insure that the reproducing stylus shall intimately follow all of the undulations of the record groove. To provide a sound-box mounting which shall meet these requirements, the sound-box is mounted as heretofore described for movement in planes at right-angles to each other about the axes defined by pivot pins 51 and 53 when the sound-box is in reproducing position.

To prevent lateral movement of the sound-box about the axis defined by pivot pin 51 when the sound-box is in recording position (see Fig. 13), sleeve 52 is slotted at its inner end, as shown at 70, to receive a pin 71 which extends through a longitudinal slot 72 in slide 62, an aperture 73 in extension 42 (see Fig. 22), and a longitudinal slot 74 in sleeve 50, into a position wherein it is embraced by the walls of slot 70 when sleeve 50 is moved outwardly to bring the recording stylus into operative position, but wherein it is free from said slot 70 when said sleeve is drawn inwardly to bring the reproducing stylus into operative position. Any suitable means may be provided for mounting said pin 71, that shown comprising a spring 71' connected at one end as by a screw to the forwardly extending portion of the sound-box carriage and engaging at its opposite end in a groove in the top of said pin, said spring normally urging pin 71 downwardly into operative position but enabling the same to give upwardly.

To press the sound-box into intimate engagement with the record tablet, when the sound-box is in reproducing position, a yoke 75 (see Fig. 22) is freely pivoted upon pivot pin 53 and provided with a downwardly extending lug 76 to which is attached one end of tension spring 77, the opposite end of said spring being attached to a depending lug 78 provided on sleeve 52, which sleeve is cut away at the lower portion of its inner end to provide for said yoke and spring. The sound-box neck 54 is also provided on its under side with a depending lug 79 in a position to be engaged by the depending portion of yoke 75, when said yoke is free to be drawn downwardly by the tension of spring 77. The tension of spring 77 is then transmitted through the co-action of yoke 75 and lug 79 to the sound-box, insuring the intimate engagement thereof with the record tablet.

To render the spring 77 functionally inoperative when the sound-box is in recording position so that the sound-box may rest lightly upon the record tablet, said yoke 75 is provided with a pair of outwardly extending ears 80 for cooperation with a pair of pins 81 (see Fig. 18) mounted in opposite sides of extension 42, and extending through slots 82 in sleeve 50 to a position wherein they may engage and cam upwardly the said ears 80 on yoke 75 when the sound-box is drawn outwardly to recording position, but wherein they are out of engagement with said ears 80 when the sound-box is drawn inwardly to reproducing position.

To provide for the raising and lowering of the sound-box as the latter is moved from one of its operative positions to the other, the sound-box is provided with a lug 82 carrying a pin 83. Pivoted upon a pair of downwardly extending ears 84 on slide 62 is a lever 85 provided at one end with a pair of upwardly extending arms 86 adapted to embrace said pin 83, the bottom of the slot between said arms 86 being inclined downwardly to a point as shown at 87 in Fig. 17 to provide for the centering of the sound-box. Adjacent its opposite end said lever 85 is provided with a bent-over finger 88 designed to co-act with a depending hump or cam surface 89 secured to the carriage frame, the cam 89 having two downwardly inclined or sloping sides 90 and 91 connected by a substantially horizontal surface 92. The finger 88 is adapted to ride over said hump from one side to the other as the slide 62 is moved from recording to reproducing position or vice versa. In passing from one side to the other the finger rides over the horizontal surface and in so doing elevates the sound box as will now be readily understood. The finger is maintained in sliding contact with the hump by means of a spring 93 conveniently placed between the slide and lever 85.

For cooperation with the feed screw 34 there is provided a feed nut 95 which is hung from a pin 96 fixed in the carriage 39. A rod 97, pressed upon by a spring 98, presses upon the nut to urge it into engagement with its screw. Cooperating with feed screw 33 is a feed nut 99 which is pivoted adjacent one end on a pin 100 fixed in the carriage.

To normally urge feed nut 99 into engagement with feed screw 33, a spring 101 is mounted within a recess in said carriage and engages an upwardly extending lug 102 on said feed nut.

To normally retain feed nut 99 out of engagement with its feed screw 33, a lever 103 is pivotally mounted upon pivot pin 104 carried by the carriage 39 on lugs 104′ depending into the slot between the ears 84 on slide 62, said lever being provided with a forwardly extending finger 105 which is designed to engage feed nut 99. To normally urge lever 103 into such a position that it holds feed nut 99 out of engagement with its corresponding feed screw, a spring 106 is mounted within a recess in said carriage and engages the upwardly extending arm of said lever.

Inasmuch as feed screw 33 is a sound-box returning or back-spacing device, it is desirable that the sound-box be maintained out of engagement with the record tablet whenever feed nut 99 is allowed to co-act with feed screw 33. Accordingly, lever 85 is provided with an outwardly and upwardly extending finger 107 which is so positioned as to be engaged by finger 105 when lever 103 is moved to permit feed nut 99 to engage feed screw 33, engagement of said fingers 105 and 107 depressing the forward end of lever 85, and thereby engaging the opposite end of said lever with pin 83 to raise the sound-box.

To actuate lever 103 to enable the engagement of feed nut 99 and feed screw 33, a crank arm 108 is hung on pin 96 to move as a unit with feed nut 95. This arm 108 may desirably be made separate from feed nut 95, but obviously could be made integrally therewith if desired. Said arm 108 is provided with a curved nose 109 in a position to engage the upwardly extending arm of lever 103 when feed nut 95 is thrown to its extreme position out of engagement with feed screw 34, such co-action of nose 109 with lever 103 actuating the latter to permit engagement of nut 99 with screw 33 and tilting the lever 85 to raise the sound-box from engagement with the record tablet.

To actuate feed nut 95 as aforesaid to throw it to its extreme inoperative position, it is provided with a nose 110, and manually operative means accessible from the exterior of the carriage are provided for engaging and operating said nose and feed nut. Said manually operative means is preferably carried by crank 66, and as shown comprises a plunger 111 extending through said crank and normally urged by a spring 112 within said crank to its uppermost position. To prevent relative rotation of said plunger and crank, the former may be provided with a pin 111′ adapted to reciprocate within a slot in the crank. As will be apparent, depression of said plunger 111 when the same is over nose 110 will move feed nut 95 out of engagement with its feed screw with the consequent function attendant thereon. It is desirable, however, that the back-spacing mechanism be operable only when the sound-box is in reproducing position as shown in Fig. 12. Accordingly, the cover plate 68, 69 for carriage 39 is provided with an aperture 113 over said nose 110 to permit said plunger to be depressed therethrough into engagement with said nose when said crank has moved the sound-box into reproducing position. In all other positions of the crank, and therefore of the sound-box, the depression of the plunger 111 will simply engage its lower end with the upper surface of the cover and therefore not effect operation of the back-spacing mechanism. As shown in Fig. 7, aperture 113 may for convenience be made a lateral extension of slot 67.

To resiliently retain the sound-box in either of its operative positions, a collar 114 is preferably secured on crank 66 coaxially with sector gear 65 and provided with a pair of notches 115 and 116. The lower edge of collar 114 is positioned within the groove 64 in the upper surface of slide 62. For co-action with the edge of said collar an arm 117 is hung on pin 96 to move as a unit with feed nut 95. Said arm 117 is desirably made separate from and attached to arm 108 and nut 95, but obviously could be made integrally therewith if desired. Arm 117 is provided, as shown in Fig. 24, with a nose 118 adapted to enter notches 115 and 116. Said notches are so positioned with respect to nose 118 that one or the other thereof is engaged with said nose when the sound-box is in recording or reproducing position. When the sound-box is being moved from one of said positions to the other, nose 118 is withdrawn from the corresponding notch and caused to ride upon the periphery of collar 114. Owing to the attachment of arm 117 to feed nut 95, the latter is withdrawn from engagement with its feed screw 34 against the tension of spring 98 when said nose is riding on the periphery of collar 114.

In addition to the means for operating the back-spacing mechanism local to the sound-box carriage, it is desirable under certain circumstances to provide means for controlling the same from a distance. In such event it is furthermore desirable that said controlling means shall comprise a device that is bodily movable at will with respect to the machine so as to enable the operator to assume different positions with relation thereto. Such an additional controlling means is illustrated on the drawings and comprises a manually operable device in the form of a key 119 pivotally mounted in a bracket 120 which may be so shaped as to be readily attached to a typewriter frame. Extending from said key 119 is a flexible connection in the form of a Bowden wire 121, the outer member or casing of which is connected by a collar 122 to a sleeve 123 mounted in bracket 120, and the inner movable member of which is connected to a plunger 124, the outer end of which is operatively engaged with a depending lug 125 on said key. At its opposite end the casing of said Bowden wire is connected to a sleeve 126 which is designed to be inserted within an aperture provided in carriage 39 and which may be retained in position by a threaded collar 127 designed to engage a threaded boss 128 provided on said carriage. The inner member of the Bowden wire is connected to a plunger 129 which extends into the recess provided in the interior of said carriage and into a position to engage an operating arm 130 (see Fig. 24) hung upon pin 96 and attached to move as a unit with feed nut 95. Said arm 130 is desirably made separate from arms 117 and 108 and feed nut 95, but obviously could be made integrally with them if desired. As shown in Fig. 24 all of said members (arms and feed nut) hung on the pin 96 are held in fixed relation, one to the other, by means of a locking pin 130' which passes through all of said members.

When the machine is to be used for reproducing, it is frequently desirable to prevent the sound-box being thrown into recording position. To this end cover 68 for carriage 39 is provided with an upwardly extending arm 131 in which is mounted a longitudinally movable pin 132. Crank arm 66 is provided in the path of pin 132 with a notch 133. When pin 132 is moved into its innermost position, it will be in the path of and engage in notch 133 preventing the crank arm from being swung to such a position as to move the sound-box into recording position. When pin 132 is moved to its outermost position, its inner end is out of the path of crank arm 66 and enables the latter to move the sound-box into any of its positions.

If desired, the carriage may be provided with a depending pointer 134 to indicate the position of the sound-box in its traverse of the record.

Associated with the above mechanism is preferably a so-called "correction device" whereby the dictator may conveniently make certain memoranda for the instruction of the transcriber. In accordance with the present invention, a correction device is provided which, in certain respects, is an improvement of that described and claimed in patent to Clinton E. Woods No. 1,153,665, granted September 14, 1915.

A support 135 for a correction-sheet is provided with pins 135' for connecting a correction-sheet thereto, and is positioned centrally of the front portion of the machine as shown, said support preferably being rotatable and being accordingly mounted upon a stub shaft 136 which is inclined downwardly and rotatably mounted in a bearing 137 provided therefor. Attached to said support is a drum 138, and to provide for the rotation of said support simultaneously with and in proportion to the movement of the sound-box as it traverses the record, a cord 139 is wound about said drum and extends over guide pulleys 140, 140', 141 and 142 to any suitable securing device 143 mounted upon the sound-box carriage 39. To rotate the support in the opposite direction as the sound-box is moved backwardly to initial position, a coil spring 144 is mounted within said drum, one end being connected to the drum at 145 and the opposite end being connected to the bearing as shown at 146.

Mounted in operative relation to said support 135 are one or more markers, the same preferably being mounted for movement into and out of operative relation with a correction-sheet on said support. In accordance with the preferred embodiment of this invention, a plate 147 is fixedly secured to the base of the machine to overlie the support 135, and is provided with a pair of ears 148 bent up in which is pivotally mounted on a pin 148' a frame 149 carrying one or more plungers 150. Fig. 8 shows said plate 147 with its ears 148 in the plane of said plate, as when said plate is stamped from sheet-metal, a convenient mode of constructing the same. Said plungers are normally urged by springs 151 to their outermost position, and are provided with suitable operating ends for marking or indenting the correction-sheet mounted upon said support.

Secured to said frame 149 is a plate 152 provided with an extending finger 153 adapted to engage the projecting end of shaft 136 when the frame is moved into operative position. Referring to Fig. 8 plate 152 is provided with apertures 154 by which the same may be secured to the base of said frame and with apertures 155 through which the plungers are designed to operate. In said Fig. 8, the plate 152 is shown upside down with respect to its operative relationship with plates 147 and 156. As a die for said plungers, a plate 156 is mounted over plate 147 and spaced therefrom by a plate 157. Plates 147 and 156 are separated sufficiently to receive the correction-sheet therebetween. Plates 147, 156 and 157 are provided with aligned apertures 158 to receive attaching means, and plates 147 and 156 are provided with aligned apertures 159 to receive the operating ends of the plungers when depressed. Plate 156 may be provided with an additional aperture 160 from one wall of which extends a pointer 161 for cooperation with a scale 162 on the correction-sheet 162′ (see Fig. 7).

When a plurality of plungers are used, it is desirable that they shall cooperate respectively with different paths on the correction-sheet. As shown, the correction-sheet is provided with a plurality of concentric zones, one for each of the plungers. The plungers may be symmetrically placed on either side of the pointer, and the punches constituted by their inner ends may be made coaxial with said plungers, as illustrated in Fig. 1, by the relative position of the apertures 155′ in plate 152. In such an arrangement the holes made thereby in the correction-sheet are out of alignment with the point indicated on the scale by pointer 161, and allowance must be made by the transcriber for such deviation. A preferable construction, wherein the punches make apertures having points directed to that portion of the scale opposite the pointer 161, is illustrated in Fig. 8 wherein the operating end of each plunger 163 is offset with respect to the axis of the plunger and is triangular in shape, the said operating ends respectively being so positioned that the apertures formed thereby indicate the same point on the scale, as will appear from the relative position of the apertures 159 in die plate 156 in Fig. 8. When the latter type of punch is employed, the apertures 155 and 159 will be triangular in shape, as also illustrated in Fig. 8.

To render an audible signal when the sound-box has reached the end of its traverse across the record tablet, a bell 166 is mounted within the base of the machine and provided with a striking lever 167 pivoted on a pin 168 carried by the hub of said bell. Said lever carries a striker 169 at one end and intermediate its length is extended to provide an operating lug 170. A spring 171, attached at one end to striking lever 167 and at its opposite end to a pin on the hub of the bell, normally urges the striker into engagement with the bell. To operate said striking lever a trip device 172 is pivotally and eccentrically mounted on a collar 173 secured to the end of shaft 136. A spring 174, wrapped around the pivot pin of said trip device, normally urges the same into engagement with a stop 175 provided on said collar. The opposite end of said trip device is designed to engage the operating lug 170 provided on striking lever 167 as shaft 136 completes its rotation and the sound-box reaches the end of its traverse, withdrawing striker 169 from engagement with the bell and then releasing the same to produce the audible signal. Upon the reverse rotation of shaft 136, under the influence of spring 144, trip device 172 is turned about its pivot against the tension of spring 174 by engagement of said trip device with said operating lug 170 until it passes the same. As will be noted, the bell is not struck during the return movement of the sound-box.

Operation: Assuming that the machine is to be used for recordation of sound, a tablet 6 is placed on the mandrel 5, switch 12 is connected to the motor, and a mouth-piece 47 is connected to the nipple 44. The motor is started by closing switch 12, by foot in the device illustrated in Fig. 1, and rotation of the motor shaft 16 causes a rotation of belt pulley 19 owing to the belt transmission 20 thereto. The belt is kept tight by the idler pulley 22 drawn into engagement therewith by the spring 23. Rotation of belt pulley 19 causes a rotation of the mandrel 5 and, through the gearing 27, 28, 29 and 30, a rotation of the two feed screws 33 and 34. The sound-box is moved into the position shown in Fig. 13 by throwing crank arm 66 to its forward position. The feed nut 95 now engages feed-screw 34 and the sound-box is moved across the record tablet. As the sound-box traverses said tablet, the support 135 for the correction-sheet is rotated simultaneously with and in proportion to the travel of the sound-box through the action of the cord 139 which is wound off of drum 138. The dictator speaks into the mouth-piece 47, and the sound waves vibrate diaphragm 56, which actuates stylus 57, cutting a record groove in tablet 6. If, during the course of the recordation, the dictator desires to give any special instructions to the transcriber, this may be done by operating the appropriate marker at the proper place. Thus, assume that one of the concentric zones on the correction-sheet is designed to indicate that matter is to be rushed, while the other zone is to indicate that special instructions are to be given. If matter is to be rushed, the dictator will at the beginning thereof depress that plunger which will punch an aperture in the zone devoted to rush matter. Similarly, if special instructions are to be given at another portion of the dictation, the dictator will at such point operate the other plunger to produce a corresponding punch mark in the appropriate zone. At the beginning the correction-sheet should be positioned upon the correction-sheet support so that the zero mark of its scale is directly opposite the pointer 161; then, particularly if the type of punch 163 illustrated in Fig. 8 be employed so that the punch mark points to that portion of the scale opposite the pointer at the time of the operation of the plunger, there is a definite indication for the transcriber to follow by which the particular portion of the dictation may be readily selected.

If, during the course of the dictation, the operator wishes to stop, he simply withdraws his foot from switch 12 and the motor is brought to rest. If in recommencing his dictation he desires to repeat the last few words spoken, he throws crank 66 to its extreme rearward position, as shown in Fig. 12. The sound-box is thereupon moved from recording to reproducing position and, owing to the transverse spacing of the styli, the reproducing stylus is brought into engagement with the tablet to the rear of that point at which the recording stylus stopped. When he has repeated the last portion of his dictation, he then returns the crank 66 to recording position and, owing to the transverse spacing of the styli, it is assured that the recording stylus will engage the surface of the tablet at a point in advance of the termination of the record groove.

If, during recordation, he wishes to cease dictation for a short period of time and accordingly wishes only be terminate the advance of the sound-box, he swings the crank 66 to neutral position, as shown in Fig. 15. As crank 66 is swung into said last-named position nose 118 of arm 17 is disengaged from notch 115 and rides upon the periphery of collar 114. By this movement feed nut 95 is disengaged from feed screw 34, but arm 108 is not moved sufficiently to operate the back-spacing mechanism.

As the sound-box reaches the end of its traverse the shaft 136 completes its rotation and trip device 172 engages operating lug 170 on striking lever 167, withdrawing striker 169 from engagement with the bell 166 and then allowing it to snap back and ring the same. As the sound-box is moved back to its initial position, spring 144, tensioned by the rotation of the correction-sheet support during the advance movement of the sound-box, rotates the support 135 and drum 138 in the opposite direction, winding up cord 139 on the latter. As trip device 172 passes operating lug 170, it is turned on its own pivot against the tension of spring 174 without actuating the striking lever.

When the sound-box is in recording position as described, pin 71 is engaged with slot 70, preventing pivotal movement of sleeve 52 on pivot pin 51. In such position the pins 81 are also in engagement with the ears 80 on yoke 75, holding said yoke out of engagement with stop 79 and rendering spring 77 functionally inoperative. As crank 66 is rotated from its extreme forward position to its extreme rearward position, sector gear 65 in mesh with teeth 63 on slide 62 produces longitudinal movement of said slide, and this movement of the slide through stud 59 produces a corresponding longitudinal movement of sleeve 50 carrying therewith sleeve 52 and sound-box neck 54. Slot 70 is thereupon disengaged from pin 71 and yoke 75 carries its ears 80 out of engagement with pins 81. Accordingly the sound-box in reproducing position is free to move in planes at right-angles to each other about the pivotal axes defined by pivots 51 and 53, and spring 77 draws yoke 75 into engagement with lug 79 and transmits its tension to the sound-box to press the same into intimate engagement with the record.

As the sound-box is so moved from recording to reproducing position by actuation of crank 66, movement of the latter causes a corresponding rotation of collar 114 whereby nose 118 on arm 117 is withdrawn from notch 115 and rides upon the periphery of said collar. As heretofore pointed out, this produces a disengagement of feed nut 95 from feed screw 34. When reproducing position is reached, nose 118 snaps into notch 116 and feed nut 95 engages feed screw 34 owing to the operation of spring 98 and pin 97. Furthermore, as slide 62 is moved rectilinearly by the rotation of sector gear 65, lever 85 is carried therewith and finger 88 is depressed by inclined surface 90 to raise arms 86 and, through their co-action with pin 83, the sound-box 55. In neutral position finger 88 is riding on horizontal surface 92, and the sound-box is maintained raised from the record. As the sound-box moves into reproducing position, finger 88 rides up inclined surface 91 and spring 93 depresses arms 86, permitting the sound-box to re-engage the record.

Assuming that the same machine is to be used during transcription of the dictation (though in practice a separate machine would probably be used), the correction-sheet is positioned on the correction-sheet support with the zero mark of its scale opposite pointer 161, and the sound-box is then moved along the record until an aperture in the zone devoted to rush matters comes opposite said pointer. The sound-box is then in position to reproduce such rush matter. The mouth-piece 47 is now replaced by ear pieces 46, and preferably the Bowden wire control is connected to boss 128 by cap 127, the bracket 120 being conveniently attached to the typewriter frame as by a set screw at 130

120'. Furthermore, to prevent the sound-box being accidentally drawn into recording position, with the resultant danger of effacement of any of the record, pin 132 is moved inwardly whereby it is in the path of notch 133 in crank 66, preventing movement of the latter to that position corresponding with the recording position of the sound-box.

Figure 14:
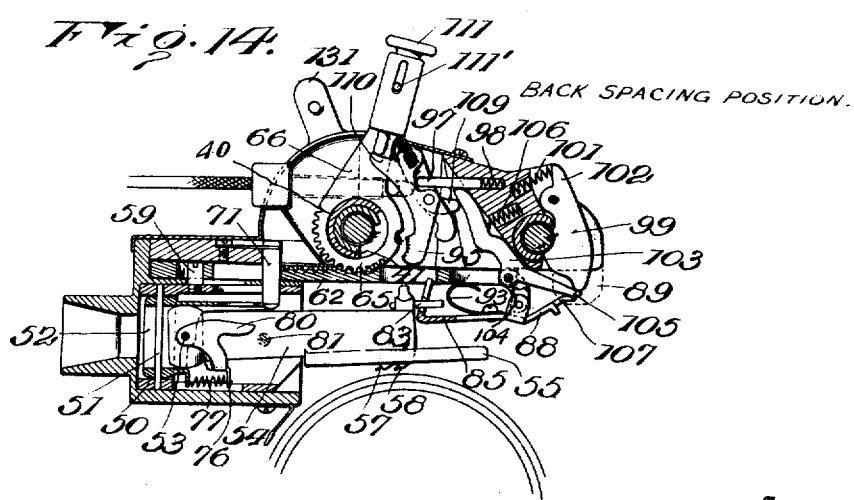
Fig. 14 is a similar view with the parts in back-spacing position.

When the sound-box is in reproducing position, plunger 111 is over aperture 113 and constitutes a controlling means for the feed device. If it is desired to repeat a portion of the record, plunger 111 is depressed and its operating end engages the nose 110 on feed nut 95, moving the latter against the tension of spring 98 out of engagement with feed screw 34. This movement of nut 95 is accompanied by a corresponding movement of arm 108, and its nose 109 engages the upwardly extending end of lever 103, elevating the latter against the tension of the spring 106 and depressing its opposite end 105 so as to permit feed nut 99 to be thrown by its spring 101 into engagement with feed screw 33. End 105, during its depression, engages finger 107 on lever 85 and, as heretofore described, raises the sound-box off of the record. The feed nut 99, by its co-action with feed screw 33, constitutes a back-spacing mechanism which feeds the sound-box rearwardly so long as plunger 111 is depressed and at a speed greater than its advance speed, owing to the greater pitch of feed screw 33. Upon release of the plunger 111 the springs 98, 101 and 106 return the feed nuts and levers from the back-spacing position shown in Fig. 14 to reproducing position.

The same sequence of events may be produced by a manipulation of the key 119 which, upon depression, slides the inner member of the Bowden wire longitudinally and engages plunger member 129 with arm 130 which, owing to its integral relation with feed nut 95, as by the pin 130' extending through all of the aforesaid members hung on pin 96, withdraws feed nut 95 from engagement with its screw 34 and permits the engagement of feed nut 99 with its feed screw 33.

The correction device while shown and described in this application is not claimed herein but is claimed in a divisional application Ser. No. 227,941, filed Apr. 11, 1918.

While the illustrated embodiment has been described with considerable particularity, it is to be expressly understood that the invention is not to be restricted to the embodiment illustrated on the drawings, as other embodiments will readily suggest themselves to those skilled in the art, while, as heretofore pointed out, certain features thereof are capable of use without other features thereof. Reference is therefore to be had to the appended claims for a definition of the limits of the invention.

What is claimed is:

1. The combination in a talking machine of a record support, a sound-box, feed devices for advancing and returning said sound-box across said support, cooperative mechanism between them adapted to be operated to render one or the other operative, and means mounted upon the machine and movable into and out of functional position, and adapted in said functional position to be operated to actuate said cooperative mechanism.

2. The combination in a talking machine of a record support, a sound-box, feed devices for advancing and returning said sound-box across said support, means for raising and lowering said sound-box with respect to a record on said support, cooperative mechanism between them adapted to be operated to render operative either the advancing feed device and the sound-box lowering means or the returning feed device and the sound-box raising means, and means mounted upon the machine and movable into and out of functional position, and adapted in said functional position to be operated to actuate said cooperative mechanism.

3. The combination in a talking machine of a record support, a sound-box, means for back-spacing said sound-box with respect to said record support, and means mounted upon the machine and movable into and out of functional position and adapted in said functional position to actuate said back-spacing means.

4. The combination in a talking machine of a record support, a sound-box, means for raising and lowering said sound-box with respect to a record on said support, means for back-spacing said sound-box with respect to said record support, and means mounted upon the machine and movable into and out of functional position, and adapted in said functional position to be operated to actuate said back-spacing and sound-box raising and lowering means.

5. The combination in a talking machine of a record support, a movable sound-box, means for moving said sound-box to and from recording and reproducing position, means for back-spacing said sound-box, and means to elevate the sound-box and to actuate said back-spacing means when said sound-box is in reproducing position.

6. The combination in a talking machine of a record support, a longitudinally displaceable sound-box provided with recording and reproducing styli, means for moving said sound-box to and from recording and reproducing position, means for back-spacing said sound box, and means rendered functionally operable by the movement of the sound-box to reproducing position and adapted to be operated to elevate the sound-box and to actuate said back-spacing means when said sound-box is in reproducing position.

7. The combination in a talking machine of a record support, a movable sound-box, means for moving said sound-box to and from recording and reproducing position, means for back-spacing said sound-box, and mechanism including a plunger rendered functionally operable by the movement of the sound-box to reproducing position and adapted to be operated to elevate the sound-box and to actuate said back-spacing means when said sound-box is in reproducing position.

8. The combination in a talking machine of a record support, a movable sound-box, means for moving said sound-box to and from recording and reproducing position, means for back-spacing said sound-box, a plate provided with an aperture, and means adapted to operate through said aperture to actuate said back-spacing means, said operating means registering with said aperture only when said sound-box is in reproducing position.

9. The combination in a talking machine of a record support, a movable sound-box, means for moving said sound-box to and from recording and reproducing position, means for back-spacing said sound-box, a plate provided with an aperture, and a spring-withdrawn plunger adapted to operate through said aperture to actuate said back-spacing means, said operating means registering with said aperture only when said sound-box is in reproducing position.

10. The combination in a talking machine of a record support, a movable sound-box, means for moving said sound-box to and from recording and reproducing position, means for back-spacing said sound-box, means operable to actuate said back-spacing means only when said sound-box is in reproducing position.

11. The combination in a talking machine of a record support, a movable sound-box, means for moving said sound-box to and from recording and reproducing position, means for back-spacing said sound-box, means operable to actuate said back-spacing means and to elevate the sound-box when said sound-box is in reproducing position, and means adapted to prevent movement of said sound-box from reproducing to recording position.

12. The combination in a talking machine of a record support, a movable sound-box, means for moving said sound-box to and from recording and reproducing position, means for back-spacing said sound-box, means rendered functionally operable by the movement of the sound-box to reproducing position for simultaneously raising said sound-box from engagement with the record and actuating said back-spacing means when said sound-box is in reproducing position.

13. The combination in a talking machine of a record support, a movable sound-box, means for moving said sound-box to and from recording and reproducing position, means for back-spacing said sound-box, means carried by said sound-box moving means for actuating said back-spacing means, and means whereby said last-named means is operable only when said sound-box is in reproducing position.

14. The combination in a talking machine of a record support, a movable sound-box, means for moving said sound-box to and from recording and reproducing position, means for back-spacing said sound-box, a plate provided with an aperture, and a plunger carried by said sound-box moving means and adapted to actuate said back-spacing means through said aperture, said plunger registering with said aperture only when said sound-box is in reproducing position.

15. The combination in a talking machine of a record support, a longitudinally movable sound-box, a rack and sector for moving said sound-box, an operating crank for said sector, means for back-spacing said sound-box, a plate provided with an aperture in the path of said crank, and a plunger carried by said crank and adapted to actuate said back-spacing means through said aperture, said plunger registering with said aperture only when said sound-box is in reproducing position.

16. The combination in a talking machine of a record support, a movable sound-box, means for moving said sound-box into and out of recording and reproducing position, means mounting said sound-box for movement in planes at right angles to each other when in reproducing position, a lever on the sound-box neck, a spring co-acting with said lever to press said sound-box into engagement with the record when in reproducing position, means brought into action by movement of said sound-box into recording position for preventing lateral movement thereof, and means engaged with said lever by said last-named movement for rendering said spring functionally inoperative.

17. The combination in a talking machine of a record support, a sound-box, a sleeve to which the sound-box neck is pivoted for movement to and from the record, a second sleeve to which said first sleeve is pivoted for lateral movement, means for reciprocating said second sleeve to move said sound-box into and out of recording and reproducing position, a pin to engage a slot in said first sleeve when said sound-box is in recording position to prevent lateral movement thereof, a lever on the sound-box neck, a spring co-acting with said lever to press the sound-box into engagement with the record when in reproducing position, and means for engaging said lever and rendering said spring functionally inoperative when said sound-box is in recording position.

18. The combination in a talking machine of a record support, a sound-box, a longitudinally movable sleeve to which said sound-box is pivoted for movement to and from the record, means for reciprocating said sleeve to move the sound-box into and out of recording and reproducing position, a lever pivoted on the sound-box neck, a spring co-acting with said lever and adapted to press the sound-box into engagement with the record when in reproducing position, and means for engaging said lever and rendering said spring functionally inoperative when the sound-box is in recording position.

19. The combination in a talking machine of a record support, a sound-box, two feed screws for respectively advancing and returning said sound-box across a record on said support, two independently and pivotally mounted nuts for co-action with said screws, a lever for raising and lowering said sound-box, and cooperating means for disengaging and engaging said nuts with their respective screws and for operating said sound-box raising-and-lowering means.

20. The combination in a talking machine of a record support, a sound-box, two feed screws for respectively advancing and returning said sound-box across a record on said support, independently mounted nuts for co-action with said screws, a lever for raising and lowering said sound-box, co-operative mechanism for disengaging and engaging said nuts with their respective screws and for operating said sound-box raising and lowering means, means for actuating said mechanism, and means whereby said actuating means is operable only when said-box is in reproducing position.

21. The combination in a talking machine of a record support, a sound-box, means for moving said sound-box laterally into and out of recording and reproducing position, means operated by said last-named means for raising and lowering said sound-box, means for back-spacing said sound-box, means for actuating said back-spacing means, and means operated by said actuating means for operating said sound-box raising-and-lowering means.

22. The combination in a talking machine of a record support, a sound-box, means comprising a rack and sector for moving said sound-box laterally into and out of recording and reproducing position, means operated by said last-named means for raising and lowering said sound-box, means for back-spacing said sound-box, means for actuating said back-spacing means, and means operated by said actuating means for operating said sound-box raising-and-lowering means.

23. The combination in a talking machine of a record support, a sound-box, means for moving said sound-box laterally into and out of recording and reproducing position, means operated by said last named means for raising and lowering said sound-box, feed screws for advancing and returning said sound-box across a record on said support, feed nuts for co-action with said feed screws, means for disengaging and engaging said nuts with their respective screws, and means operated by said last-mentioned means for operating said sound-box raising-and-lowering means.

24. The combination in a talking machine of a record support, a sound-box, means comprising a rack and sector for moving said sound-box laterally into and out of recording and reproducing position, means operated by said last-named means for raising and lowering said sound-box, feed screws for advancing and returning said sound-box across a record on said support, feed nuts for co-action with said feed screws, means for disengaging and engaging said nuts with their respective screws, and means operated by said last-mentioned means for operating said sound-box raising-and-lowering means.

25. The combination in a talking machine, of a record support, recording means and reproducing means adapted respectively to have independent engagement with a record on the record support, means for shifting the recording means laterally into operative position while removing the reproducing means, or vice versa, means adapted to produce advancing relative movement between the recording and reproducing means and the record support, means adapted to produce returning and back spacing relative movement between the recording and reproducing means and the record support, and actuating means for the last named means, including a movable part carried upon said shifting means and constituting therewith a singular manipulating member adapted to be engaged by one hand to respectively place in operative position the recording means, the reproducing means, and the returning and back-spacing means.

26. In a talking machine, recording means, reproducing means, returning and back-spacing means, and a pivotally mounted manipulating control device adapted to be engaged by one hand to respectively place in operation the recording means, the reproducing means, and the returning and back-spacing means.

27. In a talking machine, recording means, reproducing means, returning and back-spacing means, a single manipulating mechanism including a lever manually operable to respectively place into operative position the recording means and the reproducing means, and means movably mounted upon said lever and adapted to be pressingly engaged by a finger of the hand engaging said lever to place in operative position the returning and back-spacing means.

28. In a talking machine, recording means, reproducing means, a carriage therefor, an advancing screw, a returning and back-spacing screw, a pivoted member mounted upon said carriage including a nut portion adapted to be engaged and disengaged with said feed screw, a trip portion of said pivoted member, manually operable means for engaging the trip portion to disengage the nut portion from the advancing screw, a nut adapted to engage the returning and back-spacing screw, means normally disengaging said nut from the returning and back-spacing screw, and a portion of said pivoted member adapted upon disengagement of the nut portion of the pivoted member from the advancing screw to actuate said last named means to engage said nut with the returning and back-spacing screw.

29. The invention as in claim 28, further characterized by means adapted to move the pivoted member into a neutral position wherein both the nut portion of the pivoted member and the other nut are simultaneously disengaged from said respective screws.

30. The invention as in claim 28, further characterized by means for shifting the recording means into operative position while removing the reproducing means, or vice versa, and a portion of said pivoted member adapted to co-operate with said shifting means to disengage said nut portion from the advancing screw while said shifting means is disposed between its positions in which said recording means and reproducing means are in their respective operative positions.

31. In a talking machine, recording means, reproducing means, a carriage therefor, an advancing screw, a returning and back-spacing screw, a pivoted member mounted upon said carriage including a nut portion adapted to be engaged and disengaged with said advancing screw, a trip portion of the pivoted member, means having an extended flexible connection adapted to be operated at a distance to engage said trip portion to operate the pivoted member to disengage the nut portion from the advancing screw, a nut adapted to engage the returning and back-spacing screw, means normally disengaging said nut from the returning and back-spacing screw, and a portion of said pivoted member adapted upon disengagement of the nut portion of the pivoted member from the advancing screw to actuate said last named means to engage said nut with the returning and back-spacing screw.

32. In a talking machine, a record support, a movable sound box, means for moving the sound box into and out of recording and reproducing positions, means mounting the sound box for movement in planes at right angles to each other when in reproducing position, a lever pivoted about a horizontal axis and adapted to engage the sound box at a point between its mounting and its point of engagement with a record on the record support, means coacting with said lever to press the sound box into engagement with the record when in reproducing position, and means adapted to relieve the pressure from the sound box when in recording position.

33. In a talking machine, a record support, a movable sound box, means for moving the sound box into and out of recording and reproducing position, means mounting the sound box for movement in planes at right angles to each other when in reproducing position, a lever adapted to engage the sound box at a point adjacent its mounting and inwardly removed from its point of engagement with a record on the record support, means coacting with said lever to press the sound box into engagement with the record when in reproducing position, and means adapted to relieve the pressure from the sound box when in recording position.

34. The combination in a talking machine of a record support, a movable sound-box, means for moving said sound-box into and out of recording and reproducing position, means mounting said sound-box for movement in planes at right angles to each other when in reproducing position, a lever on the sound-box neck, a spring co-acting with said lever to press said sound-box into engagement with the record when in reproducing position, means adapted to prevent lateral movement of said sound box in the recording position thereof, and means adapted to relieve said pressure from said sound box in recording position.

35. The combination in a talking machine of a record support, a sound-box, a sleeve to which the sound-box neck is pivoted for movement to and from the record, a second sleeve to which said first sleeve is pivoted for lateral movement, means for reciprocating said second sleeve to move said sound-box into and out of recording and reproducing position, means adapted to press the sound-box into engagement with the record when in reproducing position, and means adapted to relieve said pressure from said sound-box in the recording position thereof.

36. The combination in a dictating machine of a record support, a movable sound-box adapted to be moved into and out of recording and reproducing positions, means mounting the sound-box for movement in vertical and horizontal planes when in reproducing position, constantly tensioned spring means adapted to apply pressure to the sound-box in the reproducing position, and means adapted to relieve the pressure of the spring means upon the sound-box in the recording position thereof.

37. The combination in a dictating machine of a record-support, a movable sound-box adapted to be moved into and out of recording and reproducing positions, means mounting the sound-box for movement in vertical and horizontal planes in reproducing position, spring means for applying pressure to the sound-box, means carried by the sound-box adapted to receive such pressure in the reproducing position, and means removed from the sound-box adapted to receive such pressure in the recording position and to relieve the pressure from the sound-box.

38. The combination in a dictating machine of a record-support, a movable sound-box adapted to move into and out of recording and reproducing positions, means mounting the sound-box for movement in vertical and horizontal planes when in reproducing position, constantly tensioned spring means for applying pressure to the sound-box, means carried by the sound-box adapted to receive such pressure in the reproducing position thereof, and means removed from the sound-box adapted to further tension the spring means and relieve the pressure from the sound-box in the recording position thereof.

39. The combination in a dictating machine of a record-support, a sound-box, feed devices for effecting relative advancing and returning movement between said sound-box and the support, cooperative mechanism between them adapted to be operated to render one or the other operative, and means for controlling said cooperative mechanism.

40. The combination in a dictating machine of a record-support, a sound-box adapted to be moved into recording and reproducing positions, means for effecting such movement, feed devices for effecting relative advancing and returning movement between said sound-box and the support, cooperative mechanism between them adapted to be operated to render one or the other operative, and means for controlling said cooperative mechanism.

41. The combination in a dictating machine of a record-support, a sound-box adapted to be moved into recording and reproducing positions, means for effecting such movement, feed devices for effecting relative advancing and returning movement between said sound-box and the support, cooperative mechanism between them adapted to be operated to render one or the other operative, and means for controlling said cooperative mechanism comprising a dictator's device mounted upon the machine in substantially adjacent relation to the cooperative mechanism, and means adapted to render said dictator's device operative only in the reproducing position of said first means.

42. The combination in a dictating machine of a record-support, a sound-box, feed devices for effecting relative advancing and returning movement between said sound-box and the support, cooperative mechanism between them adapted to be operated to render one or the other operative and means for controlling said cooperative mechanism.

In testimony whereof I have signed this specification.

FRANK C. HINCKLEY.

Certificate of Correction.

It is hereby certified that in Letters Patent No. 1,422,266, granted July 11, 1922, upon the application of Frank C. Hinckley, of Bridgeport, Connecticut, for an improvement in "Talking Machines," errors appear in the printed specification requiring correction as follows: Page 5, at the end of line 6 insert the words *As shown, said slide is provided with a pair of slots 94 to receive the upwardly extending arms 86 and enable their free movement.;* page 6, line 80, for the word "connecting" read *attaching*, and line 111, after the words "pair of" insert the words *bent up;* page 8, line 36, for the word "be" read *to;* page 9, line 119, claim 5, after the word "means" insert the words *rendered functionally operable by the movement of the sound-box to reproducing position and adapted to be operated;* and that the said Letters Patent should be read with these corrections therein that the same may conform to the record of the case in the Patent Office.

Signed and sealed this 29th day of August, A. D., 1922.

[SEAL.]

KARL FENNING,
*Acting Commissioner of Patents.*